United States Patent [19]
Yamada et al.

[11] Patent Number: 5,185,829
[45] Date of Patent: Feb. 9, 1993

[54] LIGHT BEAM DEFLECTOR FOR DEFLECTING LIGHT FROM OPTICAL WAVEGUIDE BY INCLINED GRATING

[75] Inventors: Masaya Yamada; Ryo Enomoto, both of Gifu, Japan

[73] Assignee: Ibiden Co., Ltd., Ogaki, Japan

[21] Appl. No.: 684,915

[22] PCT Filed: Aug. 15, 1990

[86] PCT No.: PCT/JP90/01038

§ 371 Date: Apr. 16, 1991

§ 102(e) Date: Apr. 16, 1991

[87] PCT Pub. No.: WO91/03000

PCT Pub. Date: Mar. 7, 1991

[30] Foreign Application Priority Data

Aug. 18, 1989 [JP] Japan ................... 1-211461

[51] Int. Cl.$^5$ ...................... G02B 5/172; G02B 4/174
[52] U.S. Cl. .......................................... 385/37
[58] Field of Search ............... 350/96.12, 96.13, 96.14, 350/96.15, 96.19; 385/4, 7, 8, 10, 37

[56] References Cited

U.S. PATENT DOCUMENTS

| | | | |
|---|---|---|---|
| 4,006,967 | 2/1977 | Kenan et al. | 359/286 |
| 4,415,226 | 11/1983 | Verber et al. | 385/10 |
| 4,425,024 | 1/1984 | Keil et al. | 350/96.14 |
| 4,470,661 | 9/1984 | Matsumoto | 350/96.13 |
| 4,762,383 | 8/1988 | Yamashita et al. | 385/7 |
| 4,929,043 | 5/1990 | Hatori | 350/96.13 |

FOREIGN PATENT DOCUMENTS 50-87662 7/1975 Japan .

OTHER PUBLICATIONS

Shah, "Fast Acoustic Diffraction-Type Optical Waveguide Modulator," *Appl. Phys. Lett.*, vol. 23, No. 10, Nov. 1973, pp. 556–558.

Yanagii, *Optical Communication Handbook*, Sep. 1, 1982, pp. 297–298 (Japanese).

*Primary Examiner*—Akm E. Ullah
*Attorney, Agent, or Firm*—Sherman and Shalloway

[57] ABSTRACT

A guided wave light-beam deflector enabling variation of laser light transmission direction with a large deviation, which has means for deflecting light in a plane parallel to an optical waveguide, and a grating as an output section disposed on the surface of or inside the waveguide and having an inclination with respect to a direction crossing at right angle to transmission direction of the guided wave, whereby light is deflected out of the plane parallel to the waveguide.

16 Claims, 1 Drawing Sheet

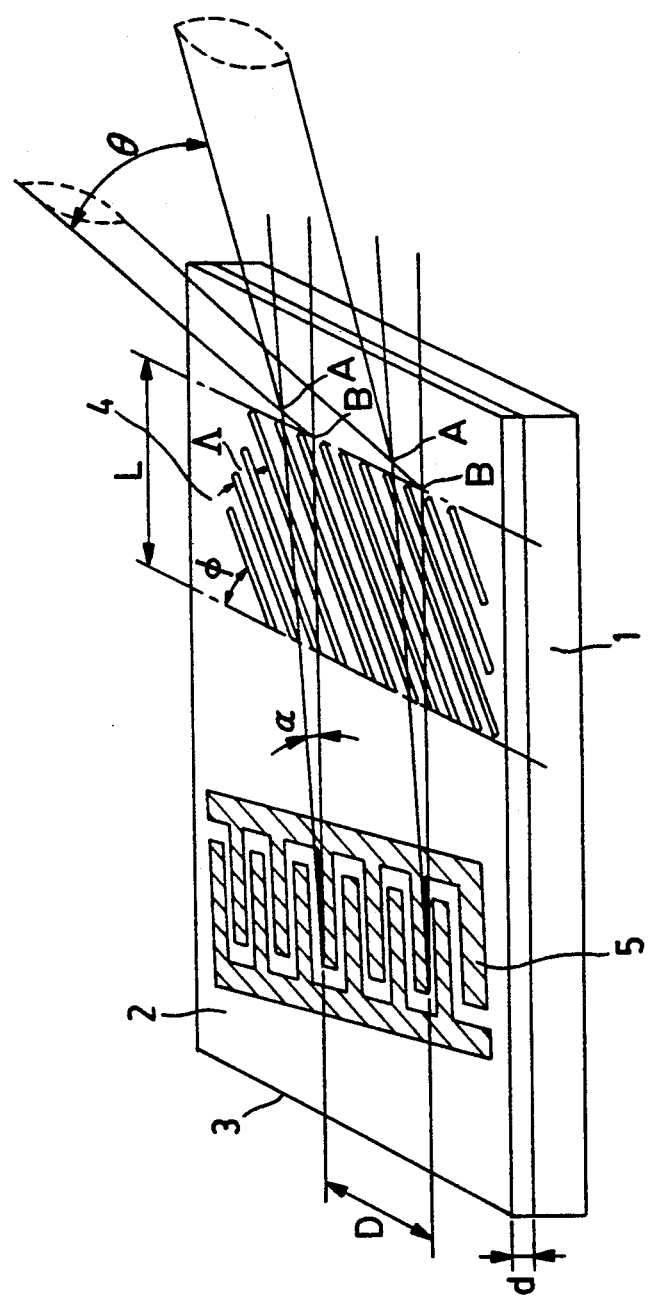

LIGHT BEAM DEFLECTOR FOR DEFLECTING LIGHT FROM OPTICAL WAVEGUIDE BY INCLINED GRATING

TECHNICAL FIELD

This invention relates to a light-beam deflector to vary direction of laser light, more specifically, to a guided wave light-beam deflector which has a large deviation.

BACKGROUND ART

Optical information processors using laser light are practically used in a variety of areas since these devices are high-speed and able to handle large amounts of information.

In these optical information processors, performance of light-beam deflectors is one of the most important factors to determine the performance of the optical information processors.

Heretofore, light-beam deflectors have been broadly classified into mechanical deflectors such as galvanometers, polygon mirrors, and hologram disks, and non-mechanical deflectors such as acoustooptic and electrooptic devices. The former is large in deviation and is thus practical, but is low in scanning speed and high-speed operation is limited, and, since it has mechanically operating portions and the optical system is complex in structure, the device tends to be large in size.

On the other hand, non-mechanical deflectors have no mechanical portions, can be controlled by optical or electrical signals, and a compact and high-speed device can be formed, and the following has been proposed.

For example, Japanese Patent Publication Laid-open 60-98422/1985 (U.S. Pat. No. 4,799,750), Japanese Patent Publication Laid-open 61-70533/1986 (U.S. Pat. No. 4,778,236, U.S. Pat. No. 4,886,587), Japanese Patent Publication Laid-open 59-192232/1984, and Japanese Patent Publication Laid-open 62-47627/1987 propose optical devices and light-beam deflectors which use acoustooptic effects or electrooptic effects to deflect light transmitting in a waveguide and output through a prism or grating, deflecting light in a plane parallel to a waveguide. However, these light-beam deflectors have problems of small deviation of only several degrees in a plane parallel to the waveguide. Japanese Patent Publication Laid-open 57-181529/1982 proposes a light-beam deflector which uses mode conversion by electrooptic effects and outputs through a prism or grating, thereby deflecting light in a plane perpendicular to the waveguide. However, since this deflector uses mode conversion, it has no continuity in deviation, and cannot be utilized in beam scanners and printers. Japanese Patent Publication Laid-open 58-125023/1983 (U.S. Pat. No. 4,762,383) proposes a two-dimensional light-beam deflector which uses acoustooptic effects to deflect guided wave in the waveguide plane and uses thermooptic effects to vary refractive index of the waveguide, thereby deflecting light in a direction perpendicular to the waveguide plane, and Japanese Patent Publication Laid-open 58-130327/1983 (U.S. Pat. No. 4,762,383) proposes a two-dimensional light-beam deflector which deflects light in a waveguide plane, and uses electrooptic effects to vary refractive index of an output grating, thereby deflecting the light in a direction perpendicular to the waveguide plane.

However, these light-beam deflectors use acoustooptic effects to deflect light in a plane parallel to the plane parallel to the waveguide, and, for the deflection in a direction perpendicular to the waveguide plane, the former uses thermooptic effects which provide a very small deviation and a slow response, and the latter uses electrooptic effects with a very small deviation. Thus, prior art non-mechanical light-beam deflectors have been very small in deviation, which makes it difficult to scan large areas, and have had no continuity in deviation, which is a problem with practical use.

Formerly, the inventors have proposed a non-mechanical light-beam deflector in Japanese Patent Publication Laid-open 1-132744/1989 which is provided in the waveguide with means for controlling the effective index and a grating for obtaining light from the waveguide with a deviation according to the effective index. However, this device has required a very large change in the effective index in order to obtain a deflection-angle range of 10°-30°, and has thus required a thin film material having so high electrooptic effects that enable large changes in the effective index.

Normally, a light-beam deflector is required to have properties as follows:

Max. deviation: $\theta \geq 30°$

Resolution: $N(=\theta/\Delta\theta) \geq 1000$ (wherein $\Delta\theta$ is a beam spread angle)

Deflection efficiency: $\eta \geq 30\%$

The scanning speed of light-beam deflector by an existing polygon mirror is about 10 kHz. However in view of high-speed operation requirements for optical information processors a scanning speed of 30 MHz or more is now required.

The inventors have conducted intensive investigations and completed a guided wave light-beam deflector having a large deviation, which does not require the use of a material having high electrooptic effects.

DISCLOSURE OF THE INVENTION

In accordance with the present invention, there is provided a light-beam deflector comprising an optical waveguide, an input section disposed at one side of the waveguide, and an output section having a grating disposed at the other side of the waveguide, the optical waveguide comprising means for deflecting guided wave in a plane parallel to the optical waveguide, and a grating disposed on the surface or inside the waveguide and having an angle from a direction crossing at right angle to the transmission direction of the guided wave, whereby the grating outputs light from a plane parallel to the optical waveguide with an angle according to a period of the grating.

Therefore, the present invention provides a light-beam deflector having means for deflecting light in a plane parallel to the optical waveguide, and the grating in the output section is disposed on the surface or inside the waveguide and has an angle with respect to the direction crossing at right angle to the transmission direction of light, thereby deflecting the guided wave out of the plane parallel to the optical waveguide.

In the present invention, the incident light is preferably laser light, because laser light has a variety of applications such as optical information processors.

The present invention will now be described in detail.

Optical waveguide used in the light-beam deflector according to the present invention is preferably a single crystal.

This is because a single crystal is low in transmission losses compared to amorphous materials or the like.

As the optical waveguide can be used, for example, a $LiNbO_3$ thin film formed on a $LiTaO_3$ substrate, a $LiTaO_3$ thin film formed on a $LiNbO_3$ substrate and a $LiNbO_3$ thin film formed on top, a $Sr_xBa_{1-x}Nb_2O_6$ (SBN) thin film formed on a $LiTaO_3$ single crystal substrate, an SBN thin film formed on an Si substrate formed on the surface with a $SiO_2$ thin film, an SBN thin film formed on a garnet substrate such as a $Gd_3Ga_5O_{12}$ (GGG), $Nd_3Ga_5O_{12}$, or $Sm_3Ga_5O_{12}$ (SmGG), a $BaTiO_3$ single crystal thin film formed on a $PbTiO_3$ single crystal substrate, a $K(Nb_xTa_{1-x})O_3$ thin film formed on a $KNbO_3$ single crystal substrate, a PLZT thin film formed on a PLZT ceramic substrate, or those which use glass comprising such as $SiO_2$ or quartz as the substrate and thin film, and, in particular, a $LiNbO_3$ thin film formed on a $LiTaO_3$ substrate is the most preferable for its high electrooptic effects.

The $LiNbO_3$ is preferably lattice-matched with the $LiTaO_3$ substrate.

The lattice matching means that lattice constant of $LiNbO_3$ is set to 99.81 to 100.07% of the lattice constant of $LiTaO_3$.

The reason why such a lattice matching is preferable is that this allows formation of a thin film which has no lattice deformation nor micro-cracks. This enables a very small transmission loss and a high deflection efficiency.

More preferably, the lattice constant is $LiNbO_3$ is set to 99.92 to 100.03% of the lattice constant of $LiTaO_3$.

Lattice matching for the present invention is achieved by containing a different element in the $LiNbO_3$ thin film waveguide layer to increase the lattice constant or, in reverse, by containing a different element in the $LiTaO_3$ substrate to decrease the lattice constant.

The different element to be contained in the $LiNbO_3$ thin film waveguide layer is preferably Na and Mg.

This is because Na and Mg atoms or ions make substitution or solid dissolution into $LiNbO_3$ to increase the lattice constant of $LiNbO_3$, and the composition of Na and Mg can be adjusted to achieve lattice matching of the $LiNbO_3$ substrate or a thin film waveguide layer with the $LiTaO_3$ substrate.

Furthermore, Mg has an effect to prevent optical damages to the thin films and is thus advantageous to obtain a high output.

Na and Mg are preferably contained in amounts of 0.1–4.8 mole % and 0.8–10.8 mole % to $LiNbO_3$.

This is because if the content of Na is smaller than 0.1 mole %, lattice matching is not obtained between the $LiNbO_3$ thin film and the $LiTaO_3$ substrate regardless of the Mg content, and, if it exceeds 4.8 mole %, the lattice constant becomes too high, and lattice matching is not achieved between the $LiNbO_3$ thin film and the $LiTaO_3$ substrate in any of the cases.

If the content of Mg is smaller than 0.8 mole %, the optical damage prevention effect is insufficient, and, if it is greater than 10.8 mole %, a $LiMgO_3$-containing crystal tends to deposit, not enabling addition of Mg.

The different element to be contained in the $LiTaO_3$ substrate is preferably Ti.

This is because Ti has an effect to decrease the lattice constant of $LiTaO_3$.

The content of Ti is preferably 5.0 to 7.0 mole %.

This is because if it is out of the above range, lattice matching with the $LiNbO_3$ thin film waveguide layer cannot be achieved.

Furthermore, the $LiNbO_3$ is preferably formed on the (0001) plane of the $LiTaO_3$. The (0001) plane is a surface perpendicular to the c-axis of the crystal.

The reason why the (0001) plane of the $LiTaO_3$ substrate is preferably the growth surface of the $LiNbO_3$ thin film is that lattice matching between the $LiNbO_3$ substrate and the $LiTaO_3$ substrate can be achieved only by varying the lattice constant of a-axis of the $LiNbO_3$ thin film or the $LiTaO_3$ substrate.

The lattice constant (a-axis) of the $LiNbO_3$ thin film formed on the $LiTaO_3$ substrate is preferably 99.81 to 100.07%, more preferably 99.92 to 100.03%, of the lattice constant (a-axis) of the $LiTaO_3$ substrate.

This is because if it is out of the above range, it is difficult to achieve lattice matching between the $LiTaO_3$ substrate and the $LiNbO_3$ thin film.

The $LiTaO_3$ substrate and the $LiNbO_3$ thin film are both preferably single crystals.

Furthermore, the $LiTaO_3$ substrate may be a $LiNbO_3$ substrate having a $LiTaO_3$ thin film formed on top.

The $LiNbO_3$ thin film preferably has a transmission loss to 0.83 μm semiconductor laser light of below 1.4 dB/cm.

This is because if the transmission loss exceeds 1.4 dB/cm, deflection efficiency will unpracticably be deteriorated.

The transmission loss means a rate of intensity loss per a unit length of light transmitting in a thin film, and this includes scattering loss and absorption loss.

Scattering loss depends on the interface condition between the substrate and thin film, surface condition of the thin film, and micro-cracks in the thin film.

Absorption loss relates to properties of the thin film, and depends on the crystallinity and impurity contents of the thin film.

In the present invention, when glass comprising $SiO_2$ or quartz is used as a thin film, it is preferable to provide electrodes comprising piezoelectric devices on the thin film, which is applied with a voltage to generate a surface acoustic wave for in-plane deflection by acoustooptic effects.

This is because the glass is difficult to have electrooptic effects.

The glass is inexpensive and advantageous for the cost reduction of the light-beam deflector.

In the present invention, it is preferable to use a material as the thin film waveguide or substrate (or thin film) which contains a different element such as Na, Cr, Mg, Nd, Ti, or V to adjust the refractive index. Particularly, Na, Cr, Nd, or Ti can be contained in the $LiNbO_3$ thin film waveguide and the $LiTaO_3$ substrate to increase the refractive indices of the thin film and substrate, and Mg or V can be contained to decrease the refractive indices of the $LiNbO_3$ thin film waveguide layer and $LiTaO_3$ substrate.

The content of Na is preferably 0.1 to 10 mole %. This is because if the Na content exceeds 10 mole %, optical characteristics of the $LiTaO_3$ will be deteriorated, and, if the Na content is lower than 0.1 mole %, the refractive index is not substantially varied. More preferably, the Na content is 0.8 to 2 mole %.

The content of Cr is preferably 0.02 to 20 mole %. This is because if the Cr content exceeds 20 mole %, optical characteristics of the $LiNbO_3$ thin film waveguide layer or the $LiTaO_3$ substrate will deteriorate, and, if it is lower than 0.1 mole %, the refractive index is not substantially varied. More preferably, the Cr content is 0.2 to 10 mole %.

Furthermore, the Mg content is preferably 0.1 to 20 mole %. This is because if the Mg content exceeds 20 mole %, optical characteristic of the LiTaO$_3$ will deteriorate, and, if it is lower than 0.1 mole %, it has no substantial effects of preventing optical damages. More preferably, the Mg content is 2.0 to 10 mole %.

The content of Ti is preferably 0.2 to 30 mole %. This is because if the Ti content exceeds 30 mole %, optical characteristics of the LiNbO$_3$ thin film waveguide layer or the LiTaO$_3$ substrate will deteriorate, and, if it is lower than 0.2 mole %, the refractive index is not substantially varied. More preferably, the Ti content is 1.0 to 15 mole %.

The content of Nd is preferably 0.02 to 10 mole %. This is because if the Nd content exceeds 10 mole %, optical characteristics of the LiNbO$_3$ thin film waveguide layer or the LiTaO$_3$ substrate will deteriorate, and, if it is lower than 0.02 mole %, the refractive index is not substantially varied. More preferably, the Nd content is 0.5 to 5 mole %.

The content of V is preferably 0.05 to 30 mole %. This is because if the V content exceeds 30 mole %, differently structured crystals will deposit in the LiNbO$_3$ thin film waveguide layer or the LiTaO$_3$ substrate, deteriorating the optical characteristics, and, if it is lower than 0.05 mole %, the refractive index is not substantially varied. More preferably, the V content is 2.0 to 10 mole %.

The above content is indicated in mole % of the different element to LiNbO$_3$ or LiTaO$_3$.

When a different element such as Na, Cr, Nd, Ti, Mg, or V is contained in the LiNbO$_3$ thin film waveguide layer, since the lattice constant and refractive index of the LiNbO$_3$ thin film waveguide are both varied, it is preferable to adjust the content of the different element as needed.

Thin film materials to form the waveguide are preferably those which can form the deflector portion in the plane of prior art waveguides, that is, materials which have relatively high coefficient of electrooptic effects, magnetooptic effects, acoustooptic effects, nonlinear optical effects, and piezoelectric effects. These materials, other than the above-described thin film materials, include LiTaO$_3$, PbTa$_2$O$_6$, and SbSI.

Means to deflect light in a plane parallel to the optical waveguide include methods which utilize electrooptic effects, magnetooptic effects, acoustooptic effects, or nonlinear optical effects. For example, methods utilizing electrooptic effects include a method in which a pair of opposite electrodes to effect periodical variation in refractive index are provided on the optical waveguide which are applied with a voltage, and a method in which a pair of opposite SAW (surface acoustic wave) generation interdigital transducers (comb type electrodes) are provided at both sides of the optical waveguide which are applied with a voltage.

Among these, the method utilizing electrooptic effects is preferable for its high response speed over others.

In the present invention, the deviation of incident light is preferably 0.3° to 7° within the waveguide plane.

This is because if the incident light deviation is smaller than 0.3°, a large deviation $\theta$ is not obtained, and, no practical means is available to obtain a deviation exceeding 7°.

The deviation is preferably 1° to 5° in the waveguide plane.

In the present invention, it is necessary to provide a grating having a slant angle with respect to the direction crossing at right angle to the transmission direction of guided wave on the surface of or inside the optical waveguide.

This is because a small deviation of light in the waveguide plane can be taken out as a large deviation.

The slant angle ($\phi$) is preferably 42° to 86°.

This is because a large deviation is not obtained with a small slant angle is less than 42°, and the deflection efficiency tends to deteriorate with a slant angle exceeding 86°.

More preferably, the slant angle is 45° to 85°.

Light input to the waveguide is preferably in an end surface input system. This is because this system can be simply formed by polishing the end surface of the waveguide.

Furthermore, the waveguide is preferably a single mode waveguide in order to enhance the proportion of light varied by the light-beam deflector and thus the deflection efficiency.

The grating is preferably provided to have a constant period within the range from 0.01 to 2.0 $\mu$m.

This is because a grating with a period less than 0.01 $\mu$m is difficult to fabricate, and, if the period exceeds 2.0 $\mu$m, a large deviation is not obtained.

More preferably, the period of the grating is 0.02 to 1.0 $\mu$m.

The optical waveguide use in the present invention is preferably of a single mode.

This is because this mode can improve the deflection efficiency over the multi-mode.

The optical waveguide preferably has a thickness gradient in a direction perpendicular to the transmission direction of light. By providing a gradient in waveguide thickness in a direction perpendicular to the light transmission direction, light transmits through different thicknesses and the effective index is varied, varying thereby the range of output light from the grating.

The grating output section of the present invention preferably has means to vary the period of the grating.

This is because by varying the period of the grating, output angle can be largely varied.

Means to vary the period of the grating preferably has electrodes provided in the grating output section when an electrostrictive material is used in the waveguide.

When a voltage is applied to the electrodes, the electrostrictive material extends and contracts to vary the period of the grating.

The waveguide of the present invention preferably has a lens to focus incident light.

This is because spread incident light is focussed to improve the deflection efficiency.

Arrangement of the light-beam deflector according to the present invention will now be described with reference to FIG. 1 which shows an embodiment.

Referring to FIG. 1, a thin film waveguide of d in thickness is provided on inventive light-beam deflector 1, of which one end surface 3 forms an input section. An output section 4 comprising a grating is disposed at a distance on the surface of or inside the optical waveguide. The grating, which has a length L and a period $\Lambda$, has a slant angle $\phi$ with respect to a direction crossing at right angle to transmission direction of the guided wave.

In the optical waveguide between the input and output sections are provided electrodes 5 to deflect the guided wave in a plane parallel to the waveguide.

In the above-arranged light-beam deflector, when laser light of a width D is inputted from the end surface 3, the laser light transmits through a thin film waveguide 2. When an electrical field is applied to the electrodes 5 disposed between the input and output sections, guided wave transmitted through the waveguide 2 is deflected by $\alpha°$ in a plane parallel to the waveguide by electrooptic effects. As a result, the light deflected by $\alpha°$ is outputted from point A, whereas light is outputted from point B when no field is applied. However, the inventive light-beam deflector is provided, as described above, with a grating which has a slant angle $\phi$ with respect to a direction crossing at right angle to transmission direction of the guided wave, and light is outputted with a deflection $\theta°$ with respect to a plane parallel to the waveguide. The principle of the deflection $\theta°$ will now be described.

Guided wave which is undeflected in a plane parallel to the waveguide is outputted from the grating with an angle corresponding to a period $\Lambda'$ which is represented by the following equation using a period $\Lambda$ and a slant angle $\phi$ of the grating in the output section.

$$\Lambda' = \Lambda/\cos\phi$$

On the other hand, guided wave deflected by $\alpha°$ in plane parallel to the waveguide is outputted with an angle corresponding to a grating period $\Lambda''$ represented by the following equation.

$$\Lambda'' = \Lambda/\cos(\phi+\alpha)$$

Thus, guided wave inputted to the grating is varied according to a change in the grating period. Therefore, the greater the change in the period, the greater the change in output angle, that is, the deviation $\theta$. In the inventive light-beam deflector, the grating is disposed on the surface of or inside the waveguide with a slant angle with respect to a direction crossing at right angle to the light transmission direction, thereby largely varying the grating period to guided wave and greatly deflecting the output angle of guided wave.

The prior art light-beam deflectors proposed in Japanese Patent Publication Laid-open 60-98422/1985, Japanese Patent Publication Laid-open 59-192232/1984, and Japanese Patent Publication Laid-open 62-47627/1987 use acoustooptic and electrooptic effects to deflect light transmitting through the waveguide and output from an output section or an end surface of an ordinary prism or a grating, which are able to deflect light only by a small angle.

The light-beam deflector proposed in Japanese Patent Publication 58-130327/1983 is a deflector which varies refractive index of a grating-formed portion as an output section by electrooptic effects to vary output angle by a substantially same effect as varying the grating period, but, since it substantially varies the grating period by electrooptic effects, it cannot obtain a large variation of grating period as seen in the present invention, and thus cannot obtain a large deviation.

Compared with these prior art light-beam deflectors, the light-beam deflector according to the present invention can largely vary the grating period as described above. Therefore, it is able to obtain a practical deviation using existing thin film materials ($LiNbO_3$, PLZT, or the like) having electrooptic or acoustooptic effects.

BRIEF DESCRIPTION OF THE DRAWING

FIG. 1 is a schematic side view showing an example of the light-beam deflector according to the present invention. In the drawing, numeral 1 indicates a substrate, numeral 2 indicates a waveguide, numeral 3 indicates an input section, numeral 4 indicates a grating (output section), and numeral 5 indicates electrodes.

BEST MODE FOR PRACTICING THE INVENTION

Example 1

A 3 μm thick $LiNbO_3$ single crystal thin film was grown on a $LiTaO_3$ substrate by a LPE growth method, and the surface mirror polished to a thickness of 1 μm.

With this thickness, the waveguide is a single-mode waveguide. One end surface was mirror polished to enable incidence of light from the end surface. Using photolithography and RF sputtering techniques, a pair of Al electrodes for generating acoustooptic waves were formed at both sides of the waveguide on the thin film.

When an electrical field was applied to the electrodes, a surface acoustic wave was generated and light was deflected by $\alpha = 3°$ in the waveguide plane.

On the surface of the waveguide opposite to the polished end surface was formed a grating 3 mm in length using electron beam lithography, which had a grating period of 0.1 μm and was inclined by 75° from a direction perpendicular to the incident direction of guided wave.

When the electrodes were applied with a high-frequency field of ±50 V and a frequency of 750 MHz, and a 0.633 μm He-Ne laser used as a light source, the output angle was varied by 32.7°, with a resolution of N=1100 and a deflection efficiency of 40%, showing sufficiently practical values as a light-beam deflector.

Example 2

A 0.3 μm thick PLZT ($PbLa_{0.38}Zr_{0.62}Ti)O_3$ single crystal thin film was grown by RF sputtering on an $Al_2O_3$ single crystal substrate, which was subjected to end surface polishing and Al electrode formation as in Example 1.

The electrodes were applied with an electrical field to generate a surface acoustic wave, whereby guided wave was deflected by $\alpha=4.5°$ in the waveguide plane. On the waveguide opposite to the polished end surface was formed a grating of a length of 3 mm using electron beam lithography, which had a grating period of 0.1 μm and was inclined by 72° from a direction perpendicular to the incident direction of guided wave.

When the electrodes were applied with a high-frequency field of ±50 V and a frequency of 1140 MHz, and a 0.633 μm He-Ne laser used as a light source, the output angle from the grating was varied by 35.0°, with a resolution of N=1200 and a deflection efficiency of 40%, showing sufficiently practical values as a light-beam deflector.

Example 3

A 3 μm thick Mg,Na-containing (6 mole % and 1 mole %, respectively) $LiNbO_3$ single crystal thin film was grown using a thermal diffusion technique on a $LiTaO_3$ single crystal substrate, in the surface layer of which was diffused with Mg, and the surface was mirror polished to a thickness of 1 μm.

With this thickness, the waveguide is a single-mode waveguide. One end surface was mirror polished to enable incidence of light from the end surface. Using photolithography and RF sputtering techniques, a pair of Al electrodes for creating periodic variation in refractive index were formed on the waveguide of the thin film.

The electrodes were applied with an electrical field to generate a surface acoustic wave by electrooptic effects, whereby a periodic variation in refractive index was generated and guided wave was deflected by $\alpha = 4°$ in the waveguide plane.

On the waveguide opposite to the polished end surface was formed a grating of a length of 3 mm using electron beam lithography, which had a grating period of 0.1 μm and was inclined by 75° from a direction perpendicular to the incident direction of guided wave.

When the electrodes were applied with an field of $\pm 10$ V, and a 0.633 μm He-Ne laser used as a light source, the output angle from the grating was varied by 32.8°, with a resolution of N=1100 and a deflection efficiency of 40%, showing sufficiently practical values as a light-beam deflector.

EXAMPLE 4

A 3 μm thick $LiNbO_3$ single crystal thin film was grown on a $LiTaO_3$ by a LPE growth method, and the surface mirror polished to a thickness of 1 μm.

With this thickness, the waveguide is a single-mode waveguide. One end surface was mirror polished to enable incidence of light from the end surface. Using photolithography and RF sputtering techniques, a pair of Al electrodes for creating periodic variation in refractive index were formed on the waveguide of the thin film.

When an electrical field was applied to the electrodes, a surface acoustic wave was generated and guided wave was deflected by $\alpha = 4°$ in the waveguide plane.

On the surface of the waveguide opposite to the polished end surface was formed a grating 3 mm in length using electrode beam lithography, which had a grating period of 0.05 μm and was inclined by 80° from a direction perpendicular to the incident direction of guided wave.

When the electrodes were applied with an electrical field of $\pm 10$ V, and a 0.633 μm He-Ne laser used as a light source, the output angle from the grating was varied by 66.4°, with a resolution was N=1,100 and a deflection efficiency of 40%, showing sufficiently practical values as a light-beam deflector.

EXAMPLE 5

A 0.3 μm thick PLZT $(PbLa_{0.38}Zr_{0.62}Ti)O_3$ single crystal thin film was grown by RF sputtering on an $Al_2O_3$ single crystal substrate, which was subjected to mirror polishing, end surface polishing, and Al electrode formation (4.0 μm between electrodes) as in Example 3.

The electrodes were applied with an electrical field to generate a surface acoustic wave by electrooptic effects, whereby guided wave was deflected by $\alpha = 3.97°$ in the waveguide plane. On the waveguide opposite to the polished end surface was formed a 3 mm long grating using electron beam lithography, which had a grating period of 0.1 μm and was inclined by 72° from a direction perpendicular to the incident direction of guide wave.

When the electrodes were applied with a high-frequency field of $\pm 10$ V, and a 0.633 μm He-Ne laser used as a light source, the output angle from the grating was varied by 30.7°, with a resolution was N=1200 and a deflection efficiency of 40%, showing sufficiently practical values as a light-beam deflector.

EXAMPLE 6

A 3 μm thick $LiNbO_3$ single crystal thin film was grown on a $LiTaO_3$ substrate by a LPE growth method, and the surface mirror polished to a thickness of 1 μm.

With this thickness, the waveguide is a single-mode waveguide. One end surface was mirror polished to enable incidence of light from the end surface. Using photolithography and RF sputtering techniques, a pair of Al electrodes for creating a periodic variation in refractive index were formed on the waveguide of the thin film.

When an electrical field was applied to the electrodes, a periodic variation in refractive index was created by electrooptic effects and guided wave was deflected by $\alpha = 4°$ in the waveguide plane.

On the surface of the waveguide opposite to the polished end surface was formed a 3 mm long grating using electron beam lithography, which had a grating period of 0.05 μm and was inclined by 70° from a direction perpendicular to the incident direction of guide wave.

When the electrodes were applied with an electrical field of $\pm 10$ V, and a 0.633 μm He-Ne laser used as a light source, the output angle was varied by 33.5°, with a resolution of N=1100 and a deflection efficiency of 40%, showing sufficiently practical values as a light-beam deflector.

UTILIZABILITY IN INDUSTRY

As described above, the present invention uses an output section which causes a deflection of light in the waveguide plane and comprises a grating, whereby a large deviation can be obtained compared to that of prior art non-mechanical light-beam deflectors, and enables a compact light-beam deflector with a high scanning frequency (especially over 30 MHz), providing large industrial effects.

We claim:

1. A light-beam deflector comprising an optical waveguide for transmitting light; said optical waveguide having two spaced end sections: an input section disposed at one end of said waveguide, and an output section at the other end of said waveguide and having a grating; said optical waveguide comprising means for deflecting light in a plane parallel to said optical waveguide and toward the grating, said grating disposed on the surface or inside said output section at an angle of from 42° to 86° to a line which is perpendicular to the direction of transmission of the light being guided by the optical waveguide, and said grating having a constant period of from 0.01 to 2 μm.

2. The light-beam deflector of claim 1 wherein said means for deflecting light in a plane parallel to said optical waveguide uses electrooptic effects.

3. The light-beam deflector according to claim 1 or claim 2 wherein said means for deflecting light deflects said light by 0.3° to 7° in a plane parallel to said optical waveguide.

4. The light-beam deflector according to claim 1 or claim 2 wherein said input section is an end surface input system.

5. The light-beam deflector according to claim 1 or claim 2 wherein said optical waveguide comprises a single crystal thin film.

6. The light-beam deflector according to claim 1 or claim 2 wherein said optical waveguide comprises a single mode optical guide.

7. The light-beam deflector according to claim 3 wherein said input section is an end surface input system.

8. The light-beam deflector according to claim 7 wherein said optical waveguide comprises a single crystal thin film.

9. The light-beam deflector according to claim 7 wherein said optical waveguide comprises a single mode optical guide.

10. The light-beam deflector according to claim 8 wherein said single crystal film comprises a $LiNbO_3$ thin film.

11. The light-beam deflector according to claim 10 wherein said single crystal film is supported on a $LiTaO_3$ substrate.

12. The light-beam deflector according to claim 11 wherein the single crystal film and substrate are lattice matched.

13. The light-beam deflector according to claim 8 wherein said single crystal thin film has a transmission loss to 0.83 $\mu$m semiconductor laser light of below 1.4 dB/cm and is a $LiNbO_3$ thin film.

14. The light-beam deflector according to claim 13 wherein said single crystal thin film is supported on a $LiTaO_3$ substrate.

15. The light-beam deflector according to claim 14 wherein the single crystal thin film and substrate are lattice matched.

16. The light-beam deflector according to claim 1 wherein the said means for deflecting light in a plane parallel to the optical waveguide is provided between the input and output section.

* * * * *